United States Patent [19]

Lin

[11] Patent Number: 4,540,477

[45] Date of Patent: * Sep. 10, 1985

[54] APPARATUS FOR PRODUCING ACICULAR OR EQUIAXED IRON OR IRON ALLOY PARTICLES

[75] Inventor: Lifun Lin, Hamden, Conn.

[73] Assignee: Olin Corporation, New Haven, Conn.

[ * ] Notice: The portion of the term of this patent subsequent to Aug. 14, 2001 has been disclaimed.

[21] Appl. No.: 570,120

[22] Filed: Jan. 12, 1984

Related U.S. Application Data

[63] Continuation-in-part of Ser. No. 499,009, May 27, 1983, Pat. No. 4,465,264.

[51] Int. Cl.³ .......................... C25C 7/00; C25F 7/00
[52] U.S. Cl. .................................. 204/242; 204/10; 204/123; 204/140; 204/297 M; 204/112
[58] Field of Search .................. 204/10, 140, 105 R, 204/123, 297 M, 242, 112

[56] References Cited

U.S. PATENT DOCUMENTS

| | | | |
|---|---|---|---|
| 1,420,127 | 6/1922 | Moxham | 204/297 M |
| 1,787,139 | 12/1930 | Cain | 204/146 X |
| 2,043,823 | 6/1936 | Young | 204/297 M |
| 2,436,244 | 2/1948 | Benner et al. | 204/146 X |
| 2,463,190 | 3/1949 | Lundbye | 204/146 X |
| 2,803,595 | 8/1957 | Anzaldi | 204/297 M X |
| 3,556,962 | 1/1971 | Pryor et al. | 204/108 |
| 4,161,434 | 7/1979 | Quinlan et al. | 204/146 |
| 4,264,419 | 4/1981 | Pryor | 204/146 |
| 4,274,865 | 6/1981 | Suzuki et al. | 75/0.5 AA |
| 4,290,799 | 9/1981 | Schroeder et al. | 75/0.5 A |
| 4,465,264 | 8/1984 | Lin | 204/140 X |

FOREIGN PATENT DOCUMENTS

| | | | |
|---|---|---|---|
| 668984 | 8/1963 | Canada | 204/10 |
| 333218 | 4/1972 | U.S.S.R. | 204/10 |

OTHER PUBLICATIONS

Grant, "Rapid Solidification of Metallic Particulates", *Journal of Metals*, Jan. 1983, pp. 20–27.

*Primary Examiner*—Donald R. Valentine
*Attorney, Agent, or Firm*—Howard M. Cohn; Barry L. Kelmachter; Paul Weinstein

[57] ABSTRACT

An apparatus for collecting ferromagnetic particles distributed in metal or metal alloy material is disclosed. A tank containing an electrolyte is provided to electrochemically dissolve the metal or metal alloy material without substantial dissolving of the particles. A support surface is provided within the electrolyte for supporting the dissolving metal material and collecting undissolved particles. The support surface further comprises the working electrode in conjunction with the metal material. A magnetic field forming device is associated with the support surface for magnetically adhering undissolved particles to the support surface so as to maximize recovery of the particles.

9 Claims, 4 Drawing Figures

C = COUNTER ELECTRODE
A = WORKING ELECTRODE
R = REFERENCE ELECTRODE

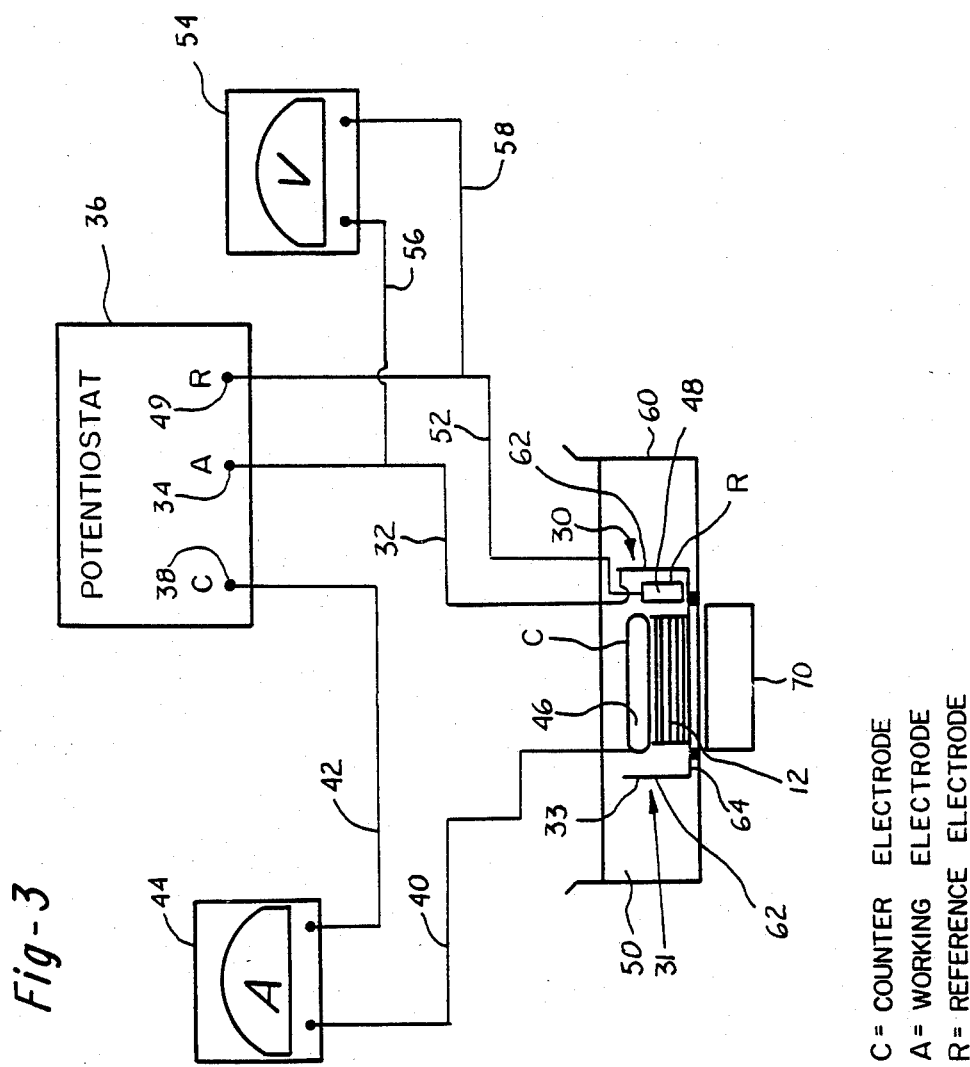

APPARATUS FOR PRODUCING ACICULAR OR EQUIAXED IRON OR IRON ALLOY PARTICLES

This application is a continuation-in-part of U.S. Ser. No. 499,009, filed May 27, 1983 (now U.S. Pat. No. 4,465,264).

While the invention is subject to a wide range of applications, it especially relates to a relatively inexpensive apparatus and method of producing substantially equiaxed or acicular iron or iron alloy particles for magnetic recording purposes.

Hitherto, various magnetic powder materials have been proposed for use in preparing magnetic recording media; for example, $\gamma$—$Fe_2O_3$, Co doped $Fe_2O_3$, $Fe_3O_4$, Co doped $Fe_3O_4$, $Fe_3O_4$—$\gamma$—$Fe_2O$, $CrO_2$, etc. The preparation of these powders requires a rather lengthy and expensive process. For example, acicular iron particles may be manufactured by fluidized bed reduction of $\gamma$—$Fe_2O_3$. These iron particles are extremely pyrophoric and require extensive processing to passivate them.

A number of different processes have been proposed for producing ferromagnetic metal alloy powder materials, such as disclosed in U.S. Pat. No. 4,274,865. Besides disclosing a process for preparing a magnetic powder suitable for magnetic recording consisting mainly of iron, this patent sets out other techniques for producing ferromagnetic acicular particles. However, there is no teaching of the unique process of manufacturing iron or iron alloy equiaxed or acicular particles as disclosed in the present invention.

U.S. Pat. No. 4,290,799 discloses, for example, "a ferromagnetic metal pigment for magnetic recording purposes which consists essentially of iron and which is distinguished by well-developed acicular particles and superior properties as a recording support, and a process for the production of this material." The process of producing metal powders, as taught by this patent, is quite different from the present invention.

In patent application Ser. No. 570,123 to Pryor et al., filed Jan. 12, 1982 and assigned to a common assignee with the present invention, a method of producing a strip of metal or metal alloy having iron or iron alloy particles distributed therethrough is disclosed. The present invention includes a novel method of dissolving the strip and collecting these particles for incorporation into particles such as magnetic recording media. This method, including the steps of producing the strip with the substantially equiaxed or acicular iron or iron alloy particles, dissolving the strip and collecting these particles, is relatively inexpensive partly because the particles are non-pyrophoric. Therefore, a significant economic advantage is thought to be achieved using the novel concept set forth herein to produce ferromagnetic particles.

U.S. Pat. No. 3,556,962 to Pryor et al. describes a method for reclaiming copper scrap containing iron and U.S. Pat. No. 4,264,419 to Pryor describes a method for electrochemically detinning copper base alloys. In both patents, there is no disclosure of teaching of providing a strip having fine iron particles distributed throughout or dissolving the strip to recover the particles. Therefore, the present invention can be clearly distinguished from those disclosures.

It is a problem underlying the present invention to provide a method for producing substantially equiaxed or acicular ferromagnetic particles of the desired magnetic or shape anisotropy which are suitable for incorporation into conventional magnetic recording mediums.

It is an advantage of the present invention to provide a method for producing substantially equiaxed iron or iron alloy particles which obviates one or more of the limitations and disadvantages of the described prior arrangement.

It is a further advantage of the present invention to provide a relatively inexpensive method of producing fine iron or iron alloy particles.

Accordingly, there has been provided a method and apparatus for producing substantially equiaxed iron or iron alloy particles. A metal or metal alloy strip having fine equiaxed particles of iron or iron alloy distributed throughout is provided. The metal strip is selectively dissolved without substantial dissolving of the iron or iron alloy particles in order to recover the particles. The method may include use of the apparatus which facilitates the collection of the particles. The collected wrought particles have a length in the range of about 0.05 to about 0.5 microns and an aspect ratio of between about 4:1 to about 15:1. The collected particles may be substantially equiaxed in a size range of about 0.05 to about 0.5 microns.

The invention and further developments of the invention are now elucidated by means of preferred embodiments shown in the drawings:

FIG. 3 is a schematic diagram of an apparatus for carrying out this invention; and FIG. 4 is a schematic diagram of an electromagnetic container in accordance with the present invention.

Figure 1:
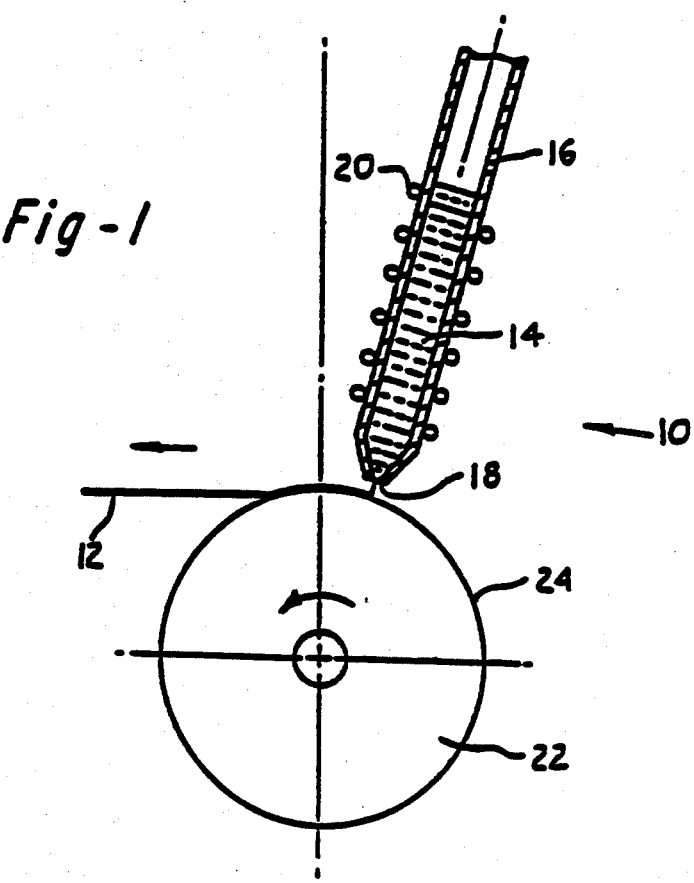
FIG. 1 is a schematic diagram of an apparatus for forming a strip with substantially equiaxed iron particles in accordance with this invention.

The present invention relates to a method and apparatus of producing substantially equiaxed or acicular ferromagnetic particles. The method requires a metal or metal strip having distributed throughout fine, substantially equiaxed particles of iron or iron alloys. A method of producing this strip is fully disclosed in U.S. patent application Ser. No. 570,123 to Pryor et al. as mentioned above. A copper base alloy strip containing ferromagnetic particles may be prepared by rapid solidification so that substantially equiaxed iron or iron alloy particles sized between about 0.05 to about 0.5 microns are distributed substantially homogeneously or isotropically throughout the solidified base metal matrix. The equiaxed particles may be either spherical or cubical in morphology. The resulting copper alloy strip has substantially equiaxed ferromagnetic particles with the desired magnetic or shape anisotropy. If desired, these substantially equiaxed fine particles may be elongated by cold rolling to produce particles whose aspect ratio is between about 4:1 and about 15:1 and preferably between about 5:1 and about 7:1. The resulting copper alloy strip has acicular ferromagnetic particles with the desired magnetic or shape anisotropy.

More specifically, a base metal is melted by any desired conventional technique. The base metal preferably comprises copper, copper alloy, gold or gold alloy. It is further within the scope of the present invention to provide small additions of transition metals as described hereinbelow. Iron is mixed into the molten base metal to form a substantially homogeneous single phase melt. Although the iron may comprise above about 20% by weight of the entire mixture, the iron is preferably about 20 to about 60% by weight of the mixture. The iron is preferably substantially pure although it may contain some impurities or doping elements.

Although this disclosure primarily describes the metallic strip as being comprised of copper and iron, it is within the scope of the present invention to add some other desired components to the melt to modify the composition of the ferromagnetic particles. Transition metal additions that enhance the magnetic performance of the resulting acicular iron alloy particles may be incorporated by alloying the melt. Nickel, cobalt, manganese and other transition elements in an effective amount up to weight percents of about 10% maximum and preferably between about 2 to about 7% are advantageous for this purpose and are within the scope of conventional alloying techniques.

The strip is preferably prepared by rapid solidification in any desired manner such as melt spinning as described in the above-mentioned patent application to Pryor et al. Other applicable techniques, such as atomization, are set forth in an article entitled "Rapid Solidification of Metallic Particulates" by Grant in *Journal of Metals*, January 1983. Using these other techniques, the non-particles may be disposed within non-continuous splats or pieces of copper alloy matrix. In general, the process of separating the desired iron particles is carried out as disclosed regarding the strip dissolutions.

Referring to FIG. 1, there an exemplary apparatus 10 is illustrated for producing a continuous long thin strip 12 of copper or copper alloy dispersed with iron or iron alloy. The mixture of molten copper base metal and iron 14 may be introduced into a heat resisting tube 16 of a material such as quartz. The tube 16 may be provided with a nozzle 18 having a diameter of about 0.3 to about 1.5 mm at one end. The molten material 14 is preferably maintained at a temperature slightly above the liquidus point of the melt by any suitable means such as a heat resistor 20. Although the temperature may be not more than about 200° C. above the liquidus point, it is preferably not more than about 100° C. above the liquidus point. Notwithstanding the above temperature limitations, the molten material may be maintained at any desired temperature. A cooling substrate 22, such as a chill wheel, may be rotatably arranged below the heat resisting tube 16. The chill wheel may be of any desired diameter and may be rotated at a peripheral speed of between approximately 1,050 to 8,400 feet per minute (fpm) and preferably between about 2,100 to 4,200 fpm. However, it is within the scope of the present invention to rotate the wheel at any desired speed. The open end 18 of the nozzle is preferably positioned less than about 5 mm and preferably less than about 2 mm from a smooth surface 24 of the wheel 22. The molten material is ejected from the tube 16 onto the rotating surface 24 under a pressure of between about 5 to about 40 psi and preferably between about 15 to about 25 psi applied to the melt 14. As soon as the molten material contacts the rotating surface 24, the melt quickly cools and solidifies into a thin continuous strip 12 having the iron particles distributed substantially homogeneously or isotropically throughout the copper base metal matrix.

The thickness and width of the obtained thin strip 12 can be determined by a number of factors. For example, the surface tension between the molten material and the surface 24 of the moving chill wheel 22 effects the shape of strip 12. As the surface tension of the melt increases relative to the wheel, the strip tends to be thicker and narrower. An increase in the rotational speed of the chill wheel forms a thinner, wider strip. The ejection pressure of the melt 14 also effects the shape of the strip. As the pressure increases, the width of the strip increases while its thickness decreases. The diameter of the nozzle between about 0.3 to 1.5 mm and preferably between about 0.8 to about 1.2 mm is a factor. The smaller the diameter of the nozzle, the thinner and more narrow the strip. Of course, the ejection temperature and viscosity of the melt are also critical factors. The hotter and less viscous the melt, the thinner and wider the strip. The viscosity is thought to be in the range of about 0.01 to about 1 poise.

The selection of the material forming the chill wheel must take into account the wettability between the molten thin strip and the surface 24. This wettability is mainly determined by surface tensions of the melt and the substrate. It has been found that a chill wheel formed of copper can be successfully used to manufacture strip of the materials set forth hereinabove. However, it is also within the terms of the present invention to use other materials such as for example, copper alloy, aluminum, aluminum alloy, steel, steel alloy or graphite.

The temperature of the molten material or melt is preferably slightly above its liquidus point. As mentioned above, although the temperature may be not more than about 200° C. above the liquidus point, it is preferably not more than about 100° C. above the liquidus point. If the temperature were below the liquidus point, the mixture would contain some solid particles and would not form properly. Conversely, if the temperature were too high above the melting point, the melt might either spread over the cooling surface of the chill wheel so that the strip becomes too thin or spray off the wheel before solidifying into a strip. Accordingly, the preferred temperature is slightly above the liquidus point so that the chill wheel can extract enough heat to immediately make the strip slightly solid and give it some mechanical stability or strength. Depending upon the particular composition of the melt and other operating parameters of the process, the cooling rate might be about $10^2$ to $10^{8°}$ K. per second and preferably between about $10^2$ to about $10^{6°}$ K. per second.

Although a chill wheel is described as the preferred apparatus for forming the strip, it is also within the terms of the present invention to form the strip by any desired conventional means.

The present invention requires the formation of a continuous strip or pieces of metal alloy that are useful as an intermediate material to produce substantially equiaxed iron or iron alloy particles. The majority of the ferromagnetic particles are homogeneously or isotropically distributed throughout the strip, substantially equiaxed in shape, and preferably sized so that each particle is a single magnetic domain, i.e. in the range of about 0.05 to about 0.5 microns. During the solidification, there are two precipitation modes of iron for a rapidly solidified copper-iron melt. The primary solidification tends to be relatively coarse and plate-like and the iron particles are generally sized above about $2\mu$. The secondary solidification occurs near the terminal stage of solidification and produces the majority of particles with a substantially equiaxed morphology having a size in the range of about 0.02 to about $0.5\mu$. The equiaxed particles may be of a cubical or spherical shape.

The particle size is determined by solid solidification time which in turn is determined by factors such as the casting rate, thickness of the casting and the thermal conductivity of the alloy. Thicker casting sections produce larger particles while thinner casting sections produce smaller particles. Also, a faster cooling rate results in the formation of smaller particles.

The final copper or copper alloy strip to be produced preferably has primarily substantially equiaxed iron or iron alloy particles isotropically or homogeneously dispersed throughout the matrix. However, it may be desirable that the final copper or copper alloy strip to be produced preferably has acicular ferromagnetic particles isotropically or homogeneously dispersed throughout the matrix. Until now, the process described has formed homogeneously or isotropically spaced equiaxed particles. The next step may then be directed to elongating the particles. To accomplish this, the cast strip is preferably rolled to obtain the desired aspect ratio. This rolling may be conducted cold or hot depending on the strength of the ferrous particles. If the rolling is conducted hot, it should be conducted at a temperature no higher than between about 300° C. to about 900° C. The aspect ratio, i.e. ratio of the length to width, of the particles is preferably between about 5:1 and about 7:1 although it may be in the range of about 4:1 to about 15:1. The strip now contains wrought, acicular, iron or iron alloy particles created by the step of rolling. It may be desirable to anneal cold rolled strip and soften the particles as required. To soften the iron particles, the annealing would require temperatures in the range of about 400° to about 900° C. Note that if the iron particle is acicular, it will not change shape in the anneal.

The process continues with the matrix of the strip or pieces being dissolved without substantial dissolving of the iron or iron alloy particles contained therein. The particles can then be recovered. The matrix is preferably dissolved by electrolysis; however, it is within the scope of the present invention to dissolve the matrix by any other desired method.

According to the preferred method of manufacture, a metallic strip containing substantially equiaxed or acicular iron or iron alloy particles, as specified above, is immersed into an aqueous electrolyte. The specific electrolyte is chosen to passivate the iron or iron alloy particles while permitting aggressive electrolytic anodic dissolution of the metal or metal alloy matrix. The control of the electrical potential at which the strip is maintained is of critical importance and is further described hereinbelow. Sodium sulfate in the neutral pH range is a preferred electrolytic for this purpose. The concentration of the sodium sulfate is not ultra critical although concentrations between about 0.05 normal to about 4.0 normal are preferred. Other electrolytes suitable for this application include alkaline metal sulfates.

After the exemplary continuous or non-continuous strip is immersed in an electrolytic bath of the type mentioned above, an electric current is passed between an electrode as a counter electrode or cathode and the strip as a working electrode or anode. The strip is preferably supported in an electrically conductive container (also serving as a working electrode) to which the external current may be applied, as described below. As the strip dissolves, the iron or iron alloy particles are collected in the platform container from which they can easily be recovered. The external potential is maintained within the passive potential range of the iron or iron alloy particles of the strip. The result is anodic dissolution of the copper matrix and recovery of passivated iron particles.

Figure 2:
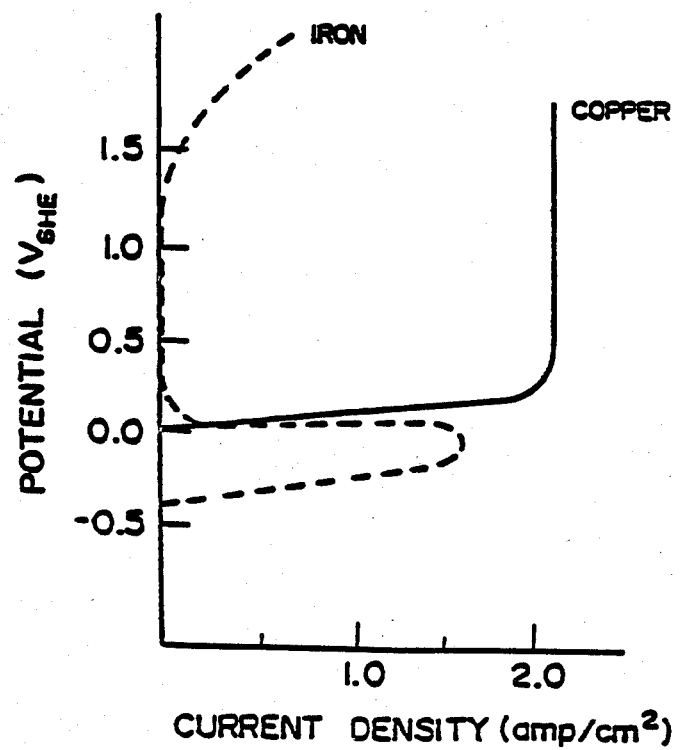
FIG. 2 is a graph of anodic dissolution of copper and iron in sodium sulfate solution.

For example, the strip is submersed in a sodium sulfate electrolyte and maintained at a critical potential of about 0.0 volts$_{SHE}$ (Standard Hydrogen Electrode) to about 1.5 volts$_{SHE}$. Furthermore, the preferred range of this electric potential is about 0.25 volts$_{SHE}$ to about 1 volt$_{SHE}$. The maximum voltages are specified so that a high anodic current on the order of approximately 2 amp/cm$^2$ is drawn from the copper or copper alloy matrix. FIG. 2, which represents the anodic dissolution of copper and iron in sodium sulfate solution, illustrates that a low current on the order of less than a few microamp/cm$^2$ is drawn from the passive iron or iron alloy particles when the potential is established as described above.

Apparatus for carrying out the process of this invention is illustrated in FIG. 3. Working electrode 30 consists essentially of an electrically conductive support surface 31 and strip 12 connected via feed wire 32 to the positive terminal 34 of a potentiostat 36. The surface 31 must be passive in the electrolyte. The negative terminal 38 of the potentiostat is connected through current meter 44 to counter electrode 46 via lead wires 42 and 40. A reference electrode 48 is connected to terminal 49 of the potentiostat by a lead wire 52. A potentiostat 54 is connected across lead wires 32 and 52 via lead wires 56 and 58 to monitor the difference in voltage between working electrode 30 and reference electrode 48. The electrolyte bath 50, as mentioned above, it held within a tank 60. The current meter 44 monitors the current while the potentiostat 54 enables the potentiostatic control of the working electrode 30 with the potentiostat 36.

The support surface may include a container 33 for supporting the strip 12 as it is dissolved by the electrochemical process occurring within tank 60. The container 33 is preferably an open top, box-like structure having side walls 62 and a bottom floor 64. The container 33 may have feet 65 to support the platform on the bottom of container 60. The container, being the working electrode, is preferably formed of an inert material which will not dissolve during the electrochemical process. It is within the terms of this invention to use inert materials such as nickel, stainless steel, platinum or palladium.

As the copper matrix of strip 12 dissolves, it is plated onto the counter electrode 46 and the majority of iron particles are set free. Some of the iron particles could still be difficult to recover for several reasons. First, the process releases pieces of copper which still contain particles of iron. These pieces of copper with iron can float in the electrolyte and thereby stay out of electrical contact with the inner surface of the container 33 or with the strip 12. This prevents the copper from dissolving and setting the trapped iron particles free. Second, free iron particles which have been collected within container 33 may spill over the sides of walls 62 either during the process or while being collected from the platform container.

To maximize the yield of particles from this process, a magnet 70 may be positioned under the support surface 31. The magnet preferably attracts the free iron particles against the floor 64 of container 61 during the process. Also, the magnet attracts the pieces of copper still containing iron particles into contact with the floor or the undissolved strip so that the copper can be farther dissolved to free the remaining iron particles. Preferably, the magnet is located outside of the tank 60 so that it is not subject to corrosion from the electrolyte 50. The magnet may be either a permanent or electromagnetic type. It must create a magnetic field capable of attracting the iron particles to hold them on the floor 64 or walls of the container. It is also within the terms of the present invention to place the magnet between the bottom surface of the tank 60 and the support surface or container 31. Locating the magnet in the electrolyte may require certain precautions, such as inert coatings or use of inert ferromagnetic material, to prevent it from corroding. It is also within the terms of the present invention to place the magnet within the floor 64 or side walls of the container 33 and encapsulate it with some non-corrosive material such as the metal of the working electrode.

A further possibility, as illustrated in FIG. 4, is to form the working electrode of a ferromagnetic alloy material such as, for example, a nickel-chrome-iron, and wrap a coil of wire 80 around this electrode. By energizing the coil with a current, the electrode becomes magnetic and will attract the iron particles as required. With this embodiment, the electromagnetic field can be applied as desired. For example, while the container 33 is being removed from tank 60 to collect the iron particles, the field can be applied to attract the particles to the container walls. Then, the field can be shut off so that the particles can be easily taken from the container. The coils may be positioned near or around the container in any desired configuration in order that the field be applied at any desired location on the container.

During the electrochemical treatment, the metallic copper is dissolved from the anodic strip material and may be easily recovered as an integral part of the processing. It is highly advantageous to use a copper counter electrode or cathode 48. The whole cathode can then be melted without contamination and reused as required. However, other metal counter electrodes such as platinum, lead, iron, stainless steel, etc. may be used and the electrodeposited copper may be subsequently stripped mechanically. The electrode potential should be lowered sufficiently at the copper counter electrode so that the copper ions passing into solution anodically deposit as metallic copper on the cathode. In general, an operating temperature range of about 20° to about 60° C. is preferred, but the process will operate economically between about 0° to about 100° C.

Once an iron particle is separated from electrical contact with the support surface 31, it will rapidly lose the passivity occasioned by its anodic treatment. The iron or iron alloy particles are somewhat protected by a thin outside film thought to be iron oxide or iron hydroxide. However, care must be exercised to prevent corrosion of the iron particles for maximum utility of process. Protection against corrosion of the separated iron particles can be achieved in several ways. The electrolytic medium may be deaerated by flushing with an inert gas, such as for example, nitrogen. The deaeration acts to prevent corrosion of the free iron particles.

A corrosion inhibitor for the iron or iron alloy phase may be incorporated into the electrolyte provided that it does not substantially reduce the anodic current carried by the copper or copper alloy matrix. These inhibitors include sodium molybdate concentrations from about $5 \times 10^{-5}$ to about $10^{-3}$ normal and sodium tungstate in concentrations from about $10^{-4}$ to about $10^{-3}$ normal. Other adsorption inhibitors may be added which have no specific influence on the anodic corrosion of the copper matrix. For exaple, copper may be anodically corroded at current densities in excess of about 10 ma/cm$^2$ in sodium sulfate solution containing about 0.005N concentrations of either sodium molybdate or sodium tungstate. These corrosion inhibitors of iron do not adversely affect the anodic current that can be drawn from the dissolution of copper at potentials in excess of about 0.45 $V_{SHE}$.

After electrochemical separation of the particles and their inhibition against corrosion in the sodium sulfate base solution, the particles are preferably rapidly filtered and washed with water to which an oxidizing corrosion inhibitor has been added. These inhibitors are drawn from the class of sodium chromate, sodium nitrite, sodium tungstate and sodium molybdate in concentrations of about 0.001N to about 0.1N. The washing is followed by rapid drying and storage under dry conditions so as to prevent corrosion. An important advantage of the present invention is that the separated iron particles are not pyrophoric and can easily be handled or processed. For additional protection from corrosion, the particles may be stored under an inert gas such as nitrogen. Also, the iron particles may be separated by size using any conventional technique such as passing through a sieve or through a fluidized bed filter.

It is also within the scope of the present invention to protect the final collected iron or iron alloy particles by coating them with a metal such as copper or cobalt. The thickness of the coating may be in the range of about 100 to about 500 microinches and preferably in the range of about 200 to about 300 microinches. The coating may be applied in any desired manner such as by using conventional electroless plating technology.

The resulting iron or iron alloy acicular or equiaxed particles may be used in any of the conventional methods for preparing magnetic recording media such as magnetic tapes, disks, floppy disks, magnetic cards or identification systems.

The patents, patent applications and paper set forth in this application are intended to be incorporated by reference herein.

It is apparent that there has been provided in accordance with this invention a method for producing iron or iron alloy particles which satisfies the objects, means, and advantages set forth above. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An apparatus for collecting ferromagnetic equiaxed particles distributed in metal or metal alloy material, comprising:

means for electrochemically dissolving said metal or metal alloy material without substantial dissolving of said ferromagnetic particles, said means for electrochemically dissolving including:

a tank containing an electrolyte;

support surface means in said tank, said support surface means being electrically conductive and in electrical contact with the dissolving metal or metal alloy material;

a working electrode comprising said support surface means and the metal or metal alloy material;

a counter electrode disposed in said tank;

means for passing an electrical current between said working electrode and said counter electrode; and magnetic field forming means associated with said support surface means for magnetically adhering dissolved ferromagnetic particles and pieces of metal or metal alloy material having undissolved ferromagnetic particles distributed therein to said support surface means so as to enhance the dissolution of the metal or metal alloy material and maximize recovery of said equiaxed ferromagnetic particles.

2. The apparatus of claim 1 wherein said magnetic field forming means is located outside of said tank.

3. The apparatus of claim 2 wherein said support surface means comprises a container having an open top, side walls and a bottom floor.

4. The apparatus of claim 3 wherein said magnetic field forming means is further located below the bottom floor of said container.

5. The apparatus of claim 4 wherein said magnetic filled forming means is a permanent magnet.

6. The apparatus of claim 4 wherein said magnetic forming means is an electromagnet type magnet in its place.

7. The apparatus of claim 3 wherein said magnetic field forming means is encapsulated within the bottom floor of said container.

8. The apparatus of claim 3 wherein said magnetic forming means is an electromagnet comprising a coil of wire wrapped around said container.

9. The apparatus of claim 8 wherein said container is formed of a ferromagnetic alloy.

* * * * *